United States Patent Office 3,429,855
Patented Feb. 25, 1969

3,429,855
NOVEL ORGANIC POLYOL COMPOSITIONS AND FILLED NON-CELLULAR POLYURETHANES PREPARED THEREFROM
David S. Cobbledick, Amherst, N.Y., assignor to Allied Chemical Corporation, New York, N.Y., a corporation of New York
No Drawing. Filed Aug. 29, 1966, Ser. No. 575,568
U.S. Cl. 260—77.5          10 Claims
Int. Cl. C08g *22/40, 51/56*

ABSTRACT OF THE DISCLOSURE

Production of liquid organic polyol compositions comprising a mixture of at least one organic polyol, an inert filler dispersed therein and an organo-mercuric salt catalyst dissolved therein which is devoid of ionizable halogen, and a stabilizing amount of red lead oxide dispersed in the mixture, useful in producing filled non-cellular polyurethane compositions upon reaction with organic polyisocyanate.

---

The present invention relates to novel organic polyol and polyurethane compositions. More particularly it relates to novel organic polyol compositions containing a filler and to new non-cellular polyurethanes prepared therefrom. It is especially concerned with such polyol compositions which contain a dissolved, storage stable organo-mercuric salt catalyst and with the novel polyurethanes prepared therefrom.

It is known to gel and cure liquid mixtures of organic polyisocyanates, and organic polyols in the presence of dissolved organo-mercuric salt catalysts. The reaction occurs under ambient conditions of temperature (ca. 25–40° C.) and pressure to afford substantially completely reacted stable non-cellular polyurethanes such as filled polyurethane elastomers, particularly polyurethane elastomeric sealants. The latter compositions can be produced in situ on plastics, ceramics and the like without application of elevated temperatures and pressures.

The organo-mercuric catalysts possess attractive features: they are inert to moisture, they discriminately catalyze the isocyanate polyol reaction rather than the competing reaction of isocyanate and water, and they provide urethane forming reaction mixtures of relatively long gelation time (pot life) and relatively slow build-up of viscosity. The advantages of long pot life and slow viscosity build-up are particularly desirable in preparing strong filled polyurethane caulks and seals in narrow spaces, cracks and crevices (as for example in preparing seals for joining ceramic sewer pipes) since the long pot life and slow viscosity build-up of the urethane-forming reaction mass permit escape of entrapped air from the liquid mass. A serious disadvantage of these mercuric catalysts is loss of catalytic activity when stored in the presence of fillers, e.g. aluminum silicate, and the organic polyol reactant for extended periods, e.g. for more than about two weeks, especially at elevated temperatures, e.g. at temperatures above 50° C.

It is therefore the principal object of this invention to devise novel organic polyol-filler compositions containing a dissolved storage-stable organo-mercuric salt catalyst and having excellent pot life and viscosity build-up characteristics on reaction with organic polyisocyanates under substantially ambient conditions of temperature and pressure.

It is another object of the invention to devise organic-polyol filler compositions containing a dissolved organo-mercury catalyst which are storage stable without alteration of the activity of said organo-mercury catalyst.

It is another object of the invention to prepare novel useful filled non-cellular polyurethanes from said polyol-filler compositions.

These and other objects and advantages will be apparent from the following description of my invention.

I have discovered that the aforementioned disadvantages of prior art organic polyol-filler-organo-mercuric salt catalyst compositions are overcome in novel liquid organic polyol compositions which are adapted for admixture with organic polyisocyanates to produce non-cellular filled polyurethanes under substantially ambient conditions of temperature and pressure. These novel polyol compositions comprise at least one organic polyol, a filler dispersed therein and an organo-mercuric salt dissolved therein which is devoid of ionizable halogen and is stabilized by lead tetroxide, i.e. $Pb_3O_4$ (red lead oxide), dispersed in the polyol.

The invention also includes useful new non-cellular filled polyurethanes prepared from said novel polyol compositions.

A preferred embodiment of my invention is directed to novel polyol-filler-catalyst compositions suitable for preparation of filled non-cellular polyurethane elastomers, particularly of filled non-cellular elastomeric sealants for ceramics e.g. for clay sewage pipes.

It was surprising to find, according to the invention, that lead tetroxide stabilizes the organo-mercuric salt catalyst on storage in the novel organic-polyol-filler compositions without substantially altering the catalyst activity, the reaction mixture pot life and the reaction mixture viscosity build-up inasmuch as use of plumbous oxide (litharge) or lead dioxide as catalyst stabilizer in the polyol component promotes the activity of the organo-mercuric catalyst thereby undesirably shortening gelation time of the liquid urethane reaction mass (see Examples 3 and 4 below.)

The novel polyol-filler compositions of the invention are prepared by efficient agitation, e.g. for about 10 minutes, of a mixture of an organic polyol or mixture of organic polyols, the filler, the lead tetroxide, and the organo-mercuric salt catalyst to obtain a dispersion of the filler and the red lead oxide in the polyol solution of the organo-mercuric catalyst. The novel organic polyol compositions thus obtained are converted to the novel non-cellular filled polyurethanes of the invention on admixture, advantageously with agitation, with an organic polyisocyanate at at least ambient conditions of temperature and pressure employing conventional reaction techniques. If convenient, the polyurethane formation can be carried out in a non-hydroxylic solvent such as dioxane, toulene, aliphatic petroleum hydrocarbons or the like.

As those skilled in the art are aware, commercial red lead oxides, in general, contain at least about 90 weight percent lead tetroxide. In preparing the novel compositions of my invention any of the red lead oxides of commerce can be used. Preferably however I employ red lead oxides which contain at least about 95 and especially 97 or more weight percent lead tetroxide. Preferably, also, red lead oxide in finely divided form which is referred to in the trade as "pigment-grade red lead" is used.

The amount of lead tetroxide which is charged to the organic polyol in preparing the novel compositions of the present invention can be varied over a wide range. Use of as little as about 0.1 percent red lead oxide based on the weight of the organic polyol in general effectively stabilizes the organo-mercuric catalyst on storage in the polyol-filler component. Use of about 5 percent or more red lead oxide based on the weight of the polyol while effective is generally uneconomical. However, as indicated below, the red lead oxide can be employed as the polyol filler. In the latter instance amounts of red lead oxide as high as about 150 percent based on the weight polyol can be used to provide catalyst stabilization. Preferably I employ about 0.5 to 2 percent and especially about 1 percent red lead oxide based on the weight of the organic polyol constituent.

The amount and nature of the organo-mercuric salt catalyst, the organic polyol, the organic polyisocyanate and filler to be employed in preparing the novel compositions of the invention can be varied over a wide range.

The organo-mercuric salt catalysts contemplated by the present invention are compounds of divalent mercury which possess a direct bond between carbon, i.e. a carbon atom of an aliphatic or aromatic radical and the mercury, and which are devoid of ionizable halogen, for example of fluorine, chlorine or bromine bonded directly to the mercury. Ionizable halogen mercury compounds to be avoided in the practice of the present invention are those whose solutions in the polyol or in ethanol give a precipitate of silver halide within 30 to 60 seconds on treatment with 50% by weight aqueous silver nitrate at 25 to 30° C. The mercuric catalysts of the invention have in general excellent solubility in the urethane-forming reaction mass and in the polyol reaction component. Representative examples of suitable organo-mercuric salt catalysts include:

phenyl mercuric acetate
o, m, or p-chlorophenyl mercuric acetate
o, m, or p-bromophenyl mercuric acetate
phenyl mercuric propionate
o, m, or p-fluorophenyl mercuric acetate
chloromethyl mercuric chloracetate
methyl mercuric decanoate
phenyl mercuric phenoxide
methyl mercuric benzonate
phenyl mercuric oleate
phenyl mercuric nitrate
2-acetoxymercuripyridine
p-tolyl mercuric acetate
phenyl mercuric butyrate
p-methoxyphenyl mercuric acetate
phenyl mercuric p-cholorobenzoate Mixtures of these and equivalent organo-mercuric salts can also be used.

Preferably an organo-mercuric salt in which an aromatic radical is bonded directly to mercury is used as catalyst. An especially good result is obtained using a phenyl or substituted-phenyl mercuric salt of an aliphatic or aromatic carboxylic acid such as phenyl mercuric propionate, p-chlorophenylmercuricacetate, or phenyl mercuric p-chlorobenzoate.

The amount of organo-mercuric salt catalyst employed in preparing the novel organic polyol and polyurethane compositions of the invention is not critical and can vary over a considerable range. Amounts as little as 0.01% based on the weight of the polyol reactant substantially accelerate the polyol-polyisocyanate reaction and amounts of 5% or more can be used. Preferably between about 0.1 and 2% of mercury compound based on the weight of the polyol component is used. The optimum amount of catalyst to be used will depend upon the particular organo-mercuric salt catalyst as well as upon the particular reactants and reaction conditions employed.

Suitable organic polyols for preparing the novel polyol compositions and non-cellular filled polyurethanes of the invention include simple polyols such as ethylene glycol or glycerol as well as polymeric polyols such as polyester polyols and polyalkylene ether polyols. Preferably the organic polyol is a polyalkylene ether polyol having a molecular weight between about 130 and 4500. Such polyols correspond essentially to the formula:

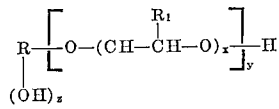

wherein R is the residue of a polyol as exemplified below, $R_1$ is hydrogen or methyl, $x$ is an integer from 1 to about 70, $y$ is an integer 1 to 6 and $z$ is an integer 0 to 5.

Such polyether polyols can be obtained in a known manner by condensation or an alkylene oxide such as ethylene oxide, 1,2 propylene oxide, or mixtures thereof with polyhydric alchols such as ethylene glycol, propylene glycol, glycerol, trimethylol propane, 1,2,6-hexanetriol, pentaerythritol, α-methyl gulcoside, sucrose or mixtures thereof in the presence of catalyst, such as trialkylamines, e.g. trimethylamine or inorganic bases e.g. potassium hydroxide, or metal halide, e.g. borontrifluoride. Polyether polyols which are derived from 1,2-propylene oxide and which are mixtures of either diols and triols (of the type illustrated in Example 1) or diols and tetrols (of the type illustrated in Example 6) are especially useful.

Typical suitable organic polyisocyanates for preparing the novel filled polyurethanes of the invention include:

Aliphatic polyisocyanates:
  Hexamethylene diisocyanate,
  Pentamethylene diisocyanate.
Cycloaliphatic polyisocyanates:
  Cyclohexyl 2,4 diisocyanate,
  4,4'-methylene-bis(cyclohexyl isocyanate).
Aromatic polyisocyanates:
  2,4-toluene diisocyanate,
  2,6-toluene diisocyanate,
  4,4-methylene bis(phenylisocyanate),
  1,5-naphthalene diisocyanate,
  4,4',4''-triphenylmethane triisoyanate,
  Polyalkylene polyaryl polyisocyanates
    disclosed in U.S. Patent 2,683,730.

Urethane prepolymers, i.e. reaction products of an excess of a diisocyanate, such as any of those given above with an organic polyol such as trimethylol propane or polyalkylene ether polyols of the type mentioned above, as well as isocyanate polymers of diisocyanates can be used also in place of the polyisocyanates noted above. Preferably the organic polyisocyanate reactant is a urethane prepolymer.

The preferred filled urethane elastomers of the invention should contain a cross-linked structure. To produce such cross-linking, it is desirable to employ a polyol and/or polyisocyanate reactant of functionality greater than 2 and especially about 2.1 to 2.7.

The proportions of organic polyisocyanate and organic polyol employed in the polyurethane-forming reaction can be varied somewhat depending upon the particular characteristics of the non-cellular polyurethane product desired. In general a proportion of polyisocyanate and polyol sufficient to provide a ratio of isocyanato to hydroxyl groups of at least 0.9:1 should be used. In preparing urethane elastomers according to a preferred embodiment of the invention an amount corresponding to a ratio of NCO:OH of between about 1:0–1.4:1 is used.

In preparing the filled non-cellular polyurethane of the invention the filler charged to the urethane-forming reaction mixture is a conventional finely divided material designated in this art as "inert." In preparing filled elastomers useful as sealants for sewer pipes and the like it is desirable that the fillers used be resistant to sewage and soil micro-organisms. Typical examples of suitable fillers include:

| | |
|---|---|
| attapulgite | calcium silicate |
| kaolin | magnesium trisilicate |
| talc | zinc sulfide |
| red lead oxide | barium sulfate |
| bentonite | calcium fluoride |
| halloysite | titanium dioxide |
| aluminum silicate | amorphous silica |

Mixtures of these and other conventional fillers can be used also.

These fillers may and usually do contain moisture, e.g. water of crystallization. Dehydrated fillers, which can be obtained by calcining moisture containing fillers, can be used in the present novel compositions. However uncalcined fillers are advantageously employed since they generally provide sealant compositions of improved resistance to acids.

The amount of filler used is not critical and can be varied over a broad range. The amount used will depend to a considerable extent upon the particular polyurethane properties and characteristics desired in the final polyurethane product. Generally the filler is added in amounts of between about 25 and 150% by weight of the polyol component, corresponding to between about 10% and about 60% by weight of the total reaction mixture.

The present invention provides novel polyol-filler-catalyst compositions containing lead tetroxide which can be stored for as long as a month or more even at elevated temperatures, e.g., of about 55° C. or higher without loss in catalyst activity when the stored polyol composition is reacted with poly-isocyanate (as illustrated in Example 1, Part C, below). Incorporation of red lead oxide in the polyol reactant as catalyst stabilizer in accordance with the invention neither increases nor decreases the commercially desirable pot life and viscosity build up of the urethane-forming reaction mass attainable with organomercuric salt catalysts either prior or subsequent to storage of the polyol reactant.

Accordingly the invention provides novel non-cellular, filled polyurethane compositions which can be formed in situ in narrow spaces, cracks, and crevices as resinous or elastomeric caulks and sealants which are substantially devoid of entrapped air, and hence of excellent strength.

The more detailed practice of my invention will be illustrated by the following examples in which parts and percentages are by weight unless otherwise noted and temperatures are in degrees centigrade.

EXAMPLE 1

Part A.—Preparation of polyisocyanate (urethane prepolymer component)

Sixty-nine parts of a mixture of about 80% 2,4-toluene diisocyanate and about 20% 2,6-toluene diisocyanate is heated to 50°. Over a period of about 30 minutes 31 parts of a 1,2-propylene glycol based poly-1,2-propylene oxide polyether (hydroxyl number 380, equivalent weight 147) is charged to the toluene diisocyanate mixture with agitation, the mixture being maintained at about 70° during the addition. On completion of the addition the reaction mass is agitated at 70° for 2 hours and cooled to ambient temperature. The resultant isocyanate-terminated urethane prepolymer has the following characteristics:

| | |
|---|---|
| Amine equivalent | 171 |
| Percent free NCO | 24.5 |
| Percent unreacted toluene diisocyanate | 25.4 |

Part B.—Preparation of polyether-polyol-filler component and polyurethane formation A filler consisting of 83.5 parts uncalcined aluminum silicate (Hydrite Flat D, Georgia Kaolin Co.,), 0.7 parts of a catalyst consisting of phenyl mercuric propionate (Metasol 57, Metal Salt Corp.) and 1.0 part of lead tetroxide (Pigment Grade Red Lead No. 97 containing at least 97% $Pb_3O_4$, Chemical and Metals Division, Eagle-Picher Corp.) are charged to 100 parts of a mixture of polyalkylene ether polyols (average equivalent weight 737; average functionality 2.3) consisting of:

| | Percent |
|---|---|
| Glycerol based 1,2-propylene oxide polyether having a hydroxyl number of 83 and an equivalent weight of 675 | 49.5 |
| Glycerol based 1,2-propylene oxide polyether having a hydroxyl number of 56 and an equivalent weight of 1000 | 16.5 |
| 1,2-propylene-glycol based 1,2-propylene oxide polyether having a hydroxyl number of 83 and an equivalent weight of 675 | 25.5 |
| 1,2-propylene glycol based 1,2-propylene oxide polyether having a hydroxyl number of 56 | 8.5 |

The mixture is agitated in a high shear mixer. (Cowles Dissolver, Morehouse Cowles Co.) for 10 minutes. The resulting warm (60–70°) dispersion is cooled to ambient temperature (about 25°). To 150 parts of the cooled dispersion is added 20 parts of the urethane prepolymer component described above thereby providing a mixture having an isocyanate group to hydroxyl group ratio of 1.05:1.0. This mixture is agitated for 30–60 seconds at about 25° and about 40 parts of the resulting fluid mass is allowed to stand at an ambient temperature of 38°. By means of a thermometer immersed in the exothermically reacting mass, the temperature of the mass is measured at intervals of 2, 3, 4, 5 and 6 minutes from commencement of agitation thus providing the temperature profile of the reaction (Exotherm). The time required for the mass to solidify to a non-fluid gel (Gelation Time) is also measured. The hardness of the non-cellular polyurethane product is measured with a Shore A Durometer (Shore Instrument and Mfg. Co., Inc.) at intervals of 10±0.25 minutes and 24 hours after commencement of agitation. The results of this experiment are presented in Table 1 below.

Part C

A 1000 part sample of polyether polyol-filler composition prepared substantially as described in Part B above is stored at 55° for 30 days and cooled to ambient temperature. To 150 parts of the resulting mixture is added 20 parts of the urethane prepolymer of Part A and the resulting mixture is thereafter treated in accordance with the procedure of Part B. The results of this experiment are presented in Table I below.

EXAMPLE 2

The procedure of Parts B and C of Example 1 is repeated substantially as described omitting addition of red lead oxide to the polyether polyol-filler component in Part B. The results obtained in Parts B and C of this example are reported in Table I below.

EXAMPLES 3–4

The procedure of Example 1 Part B is repeated in several experiments wherein oxides of lead other than red lead oxide are employed in preparing the polyether polyol-filler component. The results of these experiments are compared with the results of Examples 1 and 2 in Table 1 below.

TABLE I

| Catalyst Stabilizer in Polyether Polyol-Component (Concentration is in percent based on amount of polyether-polyol charged) | Storage Period of Polyether Polyol-Filler Component Before Admixture of Urethane Prepolymer | Exotherm (Temperature of reaction mass (degrees) at the stated intervals in minutes from beginning of agitation of the mixture of polyether polyol reactant and the urethane prepolymer reactant) | | | | | Gelation Time (Minutes) | Hardness of Polyurethane Elastomer Product | |
|---|---|---|---|---|---|---|---|---|---|
| | | 2 | 3 | 4 | 5 | 6 | | After 10 Minutes | After 24 Hours |
| Example 1: | | | | | | | | | |
| Part B.... 1.0% red lead oxide (i.e. $Pb_3O_4$). | None | 32.5 | 37.5 | 42.5 | 46.5 | 48.5 | 6.25±0.25 | 53 | 75 |
| Part C........do........ | 30 days at 55° | 34 | 38.5 | 43 | 47 | 48.5 | 6.25±0.25 | 60 | 75 |
| Example 2: | | | | | | | | | |
| Part B.... None | None | 31.5 | 37 | 42.5 | 46.5 | 48.5 | 6.25±0.25 | 60 | 75 |
| Part C........do........ | 30 days at 55° | 29 | 32.5 | 37 | 40.5 | 43 | 12.0±0.25 | | 75 |
| Example 3.... 1.0% PbO | None | 37 | 42 | 47 | 48.5 | | 5.0±0.25 | 48 | 75 |
| Example 4.... 1.0% $PbO_2$ | do | 36.5 | 43.5 | 48 | | | 4.75±0.25 | 64 | 75 |

In the above table comparison of the Gelation Times and Exotherms of Parts B and C, Example 1 with those of Example 2 indicate that lead tetroxide effectively stabilizes the activity of the organo-mercuric salt catalyst on long term storage of the latter in the polyether polyol at relatively elevated temperature.

Comparison of the Gelation Time and Exotherm of Example 1, Part B, with the corresponding values of Example 2, Part B, demonstrates that red lead oxide does not substantially alter the activity of the organo-mercuric salt in catalyzing the polyurethane-forming reaction. The results of Examples 3 and 4 on the other hand indicate that PbO and $PbO_2$ substantially enhance the activity of the organo-mercuric salt catalyst thereby materially shortening gelation time.

EXAMPLE 5

The following example illustrates the relatively slow viscosity build up in liquid urethane-forming reaction mixtures employing an organo-mercuric salt catalyst stabilized with red lead oxide in accordance with the invention.

200 parts of polyol-filler-catalyst-red lead oxide component of Example 1, Part B, and 26.5 parts of urethane prepolymer of Example 1, Part A, are prepared, combined and agitated, substantially in accordance with the procedure of Example 1. The increasing viscosity of the liquid exothermic reaction mixture is measured at intervals of 2, 3, 4 and 5 minutes from the commencement of agitation employing a Brookfield Viscometer Model RVF (Brookfield Engineering Corp.) at a viscometer spindle rotation speed of about 20 revolutions per minute. The viscosity values obtained are reported in Table II below together with the size of the viscometer spindle used.

TABLE II

| Time from Commencement of Agitation (Minutes) | Viscosity of the liquid Urethane-forming Reaction Mass (Centipoises) | Spindle size, Number |
|---|---|---|
| 2 | 4,200 | 5 |
| 3 | 6,000 | 5 |
| 4 | 12,200 | 5 |
| 5 | 48,000 | 6 |

The above figures indicate a desirably slow viscosity build up in the liquid urethane reaction mass prior to gelatin.

EXAMPLE 6

The procedure of Example 1 is repeated substantially as described except that the polyalkylene polyol charged in preparing the polyether polyol component of Parts B and C consists of a mixture (hydroxyl number 76, average equivalent weight 737, average functionaly 2.55) of:

| | Percent |
|---|---|
| α-Methyl glucoside based 1,2-propylene oxide polyether | 55 |
| 1,2-propylene glycol based 1,2-propylene oxide polyether | 45 |

Excellent results substantially equivalent to the results of Example 1 are obtained.

I claim:
1. A composition of matter adapted for admixture with an organic polyisocyanate to produce a filled non-cellular polyurethane composition comprising:
   (a) at least one organic polyol having (i) dispersed therein an inert filler and (ii) dissolved therein an organo-mercuric salt catalyst which has at least one mercury to carbon bond and is devoid of ionizable halogen atoms, and
   (b) a stabilizing amount of red lead oxide.
2. A composition as claimed in claim 1 wherein said catalyst is an aromatic mercury salt.
3. A composition as claimed in claim 2 wherein said aromatic mercury salt is phenyl mercuric propionate.
4. A composition as claimed in claim 1 wherein the organo-mercury catalyst is present in an amount ranging from about 0.01% to about 5% by weight of polyol.
5. A composition as claimed in claim 1 wherein the red lead oxide is in finely divided form and contains at least about 95 weight percent lead tetroxide.
6. A composition as claimed in claim 1 wherein the red lead oxide is present in an amount ranging from 0.5 to 2 percent by weight of polyol.
7. A non-cellular fluid polyurethane composition comprising the reaction product of (i) an organic polyisocyanate and (ii) a composition of matter comprising:
   (a) at least one organic polyol having (i) dispersed therein an inert filler and (ii) dissolved therein an organo-mercuric salt catalyst which has at least one mercury to carbon bond and is devoid of ionizable halogen atoms, and
   (b) a stabilizing amount of red lead oxide.
8. A polyurethane composition as claimed in claim 7 wherein the proportions of the organic polyisocyanate to polyol are such as provide an NCO:OH ratio of at least 0.9:1.
9. A polyurethane composition as claimed in claim 7 wherein said polyisocyanate is an aromatic diisocyanate and said catalyst is an aromatic mercuric salt.
10. A polyurethane composition as claimed in claim 7 wherein said mercuric salt is phenyl mercuric propionate and said red lead oxide contains at least 95% lead tetroxide.

References Cited

UNITED STATES PATENTS

| 3,015,634 | 1/1962 | Ferrigno | 260—2.5 |
| 3,280,049 | 10/1966 | Hyre et al. | 260—2.5 |
| 3,294,697 | 12/1966 | LeFevre | 252—188.3 |
| 3,201,136 | 8/1965 | Harrison et al. | 277—198 |

JAMES A. SEIDLECK, *Primary Examiner.*

M. J. WELSH, *Assistant Examiner.*

U.S. Cl. X.R.

277—198; 285—80; 260—75, 37; 252—182, 188.3